(12) United States Patent
Hall

(10) Patent No.: US 8,368,023 B2
(45) Date of Patent: Feb. 5, 2013

(54) OPTICAL BYPASS DEVICE

(75) Inventor: Peter Hall, Cambridgeshire (GB)

(73) Assignee: Thermoteknix Systems Limited, Waterbeach, Cambridgeshire (GB)

( * ) Notice: Subject to any disclaimer, the term of this patent is extended or adjusted under 35 U.S.C. 154(b) by 470 days.

(21) Appl. No.: 12/724,481

(22) Filed: Mar. 16, 2010

(65) Prior Publication Data

US 2010/0243890 A1    Sep. 30, 2010

(30) Foreign Application Priority Data

Mar. 27, 2009    (GB) .................................... 0905275.4

(51) Int. Cl.
*G01J 5/00*    (2006.01)
(52) U.S. Cl. ..................................................... 250/338.1
(58) Field of Classification Search ................ 250/338.1
See application file for complete search history.

(56) References Cited

U.S. PATENT DOCUMENTS 4,295,153 A * 10/1981 Gibson ........................... 348/49
2008/0302966 A1    12/2008 Reed et al.

OTHER PUBLICATIONS

Nivisys Industries, L.L.C., "TACS—Thermal Acquisition Clip-On System".

* cited by examiner

*Primary Examiner* — David Porta
*Assistant Examiner* — Hugh H Maupin
(74) *Attorney, Agent, or Firm* — Barlow, Josephs & Holmes, Ltd.

(57) ABSTRACT

An optical bypass device comprises a pair of prisms. The capture apertures of the prisms are provided on either side of a projector block. The exit apertures are substantially adjacent to one another. In this manner the prisms can act to direct incident light around the projector block and into the image intensifier aperture. In the projector block is provided an OLED screen operable to display an image including text overlay information corresponding to that captured by the thermal imaging camera. The image is projected through a small opening provided where the prisms are connected.

25 Claims, 2 Drawing Sheets

OPTICAL BYPASS DEVICE

The present invention relates to an optical device operable to combine light from two separate sources into a single image.

In certain circumstances it may be desirable to combine image information from two or more sources to provide a composite image. One such occasion is where it is desirable to provide text data (such as range or similar) over an image. Another such occasion is where it may be desirable to combine image data from an image intensifier ($I^2$) with image data obtained from a thermal imager. An image intensifier amplifies visible light and near infra red light (say 400 nm-900 nm in wavelength); whilst a thermal imager operates in a further portion of the infra red light spectrum (say 7000 nm-14000 nm in wavelength). This is advantageous as the longer wavelengths are generally less attenuated by smoke and dust, although image intensifiers generally have better resolution than thermal imagers.

Current night vision systems using image intensification benefit from higher resolution and more natural imaging in comparison to imaging in the far infrared. However, $I^2$ systems are limited in so far as they do need at least some ambient light to operate. A typical intensifier tube becomes noise limited at around 100 μlux which corresponds to a moonless overcast night sky. At this point and at lower light levels effective night vision requires infrared systems.

Thermal imaging also offers advantages over $I^2$ in detecting targets concealed by camouflage. Addressing $I^2$ limitations by including a thermal imaging capability improves overall night vision performance but at the expense of complexity and weight. Hand held systems are easy to interchange when each system is self contained with its own optics, display and power supply. On the other hand helmet or system mounted image intensifiers cannot be easily swapped over.

An example of an apparatus that provides this image combination is disclosed in US2008/0302966. In this system, a conventional image intensifier is provided with a clip on attachment comprising a thermal imager, a projector operable to project a visible image captured by the thermal imager and a light turning element which turns light from the projector into the aperture of the image intensifier. In this manner image from the thermal imager and the image intensifier may be combined to provide a single image. This apparatus does however have drawbacks in that the light turning element obstructs the field of view of the image intensifier. Additionally, the contrast from the projected light may reduce the sensitivity of the image intensifier because obstruction of the intensifier objective allows less visible light to enter the intensifier tube. A further drawback is that the system cannot be used in daylight for viewing just the thermal image.

It is therefore an object of the present invention to provide an optical device that at least partially overcomes or alleviates the above problems.

According to a first aspect of the present invention there is provided an optical bypass device comprising: a pair of prisms having separated capture apertures and adjacent exit apertures; and a projector provided between the prisms and operable to project light through an opening provided between the exit apertures of the prisms.

In this manner, light incident on the capture apertures can pass to the exit apertures without the projector obstructing the field of view whilst the projector can also project additional light which can be combined with that captured by the prisms. For the avoidance of doubt, in the text herein below the terms 'light' and 'optical' are intended to refer to electromagnetic radiation, particularly in the visible part of the spectrum but also in the infra red or ultraviolet parts of the spectrum, if appropriate or desired.

The projector may comprise a display unit of any suitable form. In particular, the display unit may be an LCD (liquid crystal display) or LED (light emitting diode) display unit. In a particularly preferable embodiment the display unit is comprised of an array of OLEDs (Organic LEDs). The projector may be provided with a lens to focus the projected image.

The projector may be controlled by electrical, optical or RF signals from a separate component or device. In particular, the projector may be operable to display any one or more of: text (including alphanumeric characters and symbols), icons, images related to those captured by the prisms or images unrelated to those captured by the prisms.

In particular, the projector may be adapted to project an image captured by another imaging device. The other imaging device may be a device adapted to capture an image in a different wavelength range. In this manner, the optical bypass device may be used to generate composite images over an extended wavelength range. In one embodiment, the other imaging device may be operable to capture an infrared image.

Preferably, the prisms are in contact at their exit apertures. In such cases, the opening is preferably comprised of corresponding cutaway sections of each prism. The cutaway sections may be formed in the prisms before assembly.

A glass plate may be bonded across the exit apertures of the prisms. This can help to maintain the structural stability of the device. One or more additional glass plates may be bonded across the prisms at their capture apertures or midway between the capture apertures and the exit apertures. Additionally or alternatively, one or more glass plates can be bonded along the sides of the prisms. In particular, these may form a full or partial box around the prisms thereby strengthening the device.

One or more lenses may be provided in order to focus the captured light as desired.

Each prism may be adapted to cover an approximately equal field of view. Sharing the field of view between two prisms in this manner allows the prism volume to be reduced compared to the volume of a single prism operable to capture an equivalent field of view.

The prisms may be adapted to block some stray light paths. Whilst this adds a degree of vignetting to the device, it can reduce the size and weight of the device. The surface tilt within the prisms may be altered to reduce the size of the device. In this respect, the surface tilt may be increased from a conventional 45° to say 47°. The prisms may be formed of a material having a high refractive index to further reduce the size of the device. In this respect, the refractive index may be around, say, 1.8.

The device may be provided within a suitable housing. The housing may be comprised of an opaque material. The housing may incorporate a raised rim provided around the capture apertures of the prisms. This can provide the prisms with some measure of protection. The housing may incorporate shutter means. The shutter means may be operable to block light from being incident on the capture apertures of the prisms. The shutter means may be powered, if desired. This allows the optical bypass device selectively to block out incident light. This can protect a delicate optical device to which the bypass is fitted in inappropriate light conditions.

The optical bypass device may be adapted to connect to an additional optical device or system. This can be achieved by providing a suitable bracket or connection element at the exit apertures. The bracket or connection element may be incorporated into the housing. In one embodiment, the optical bypass device may be adapted to be fitted to an image intensifier. In another embodiment, the optical bypass device may be adapted to be fitted to a magnifying device or other device utilising the optical capture of visible light. The optical bypass device is advantageous for fitting to any existing optical system such as a telescope, camera, imager or intensifier where additional textual data or image data must be injected with minimum interference with the optical system's field of view. In yet another embodiment a laser rangefinder may be clipped to the side of a camera having an optical bypass device attached thereto, wherein the range textual information is injected into the camera lens without unduly interfering with the camera's field of view using the optical bypass device.

According to a second aspect of the present invention there is provided a thermal imaging attachment for an image intensifier comprising: a thermal imaging device operable to capture an image and output a signal indicative thereof; an optical bypass device in accordance with the first aspect of the present invention, the optical bypass device adapted such that its exit apertures may be positioned adjacent to the aperture of the image intensifier and such that the projector of the optical bypass device is operable in response to the signal output by the thermal imaging device.

The attachment of the second aspect of the present invention may incorporate any or all features of the optical bypass device of the first aspect of the present invention as desired or as appropriate.

BRIEF DESCRIPTION OF THE DRAWING FIGURES

In order that the invention may be clearly understood, one embodiment will now be described further below, by way of example only, and with reference to the accompanying drawings in which:

FIG. 2b is a schematic cross-sectional illustration of the prism arrangement of an optical bypass device according to the present invention, adapted to provide a narrower field of view than the arrangement of FIG. 2a.

DETAILED DESCRIPTION OF THE PREFERRED EMBODIMENTS

Figure 1:
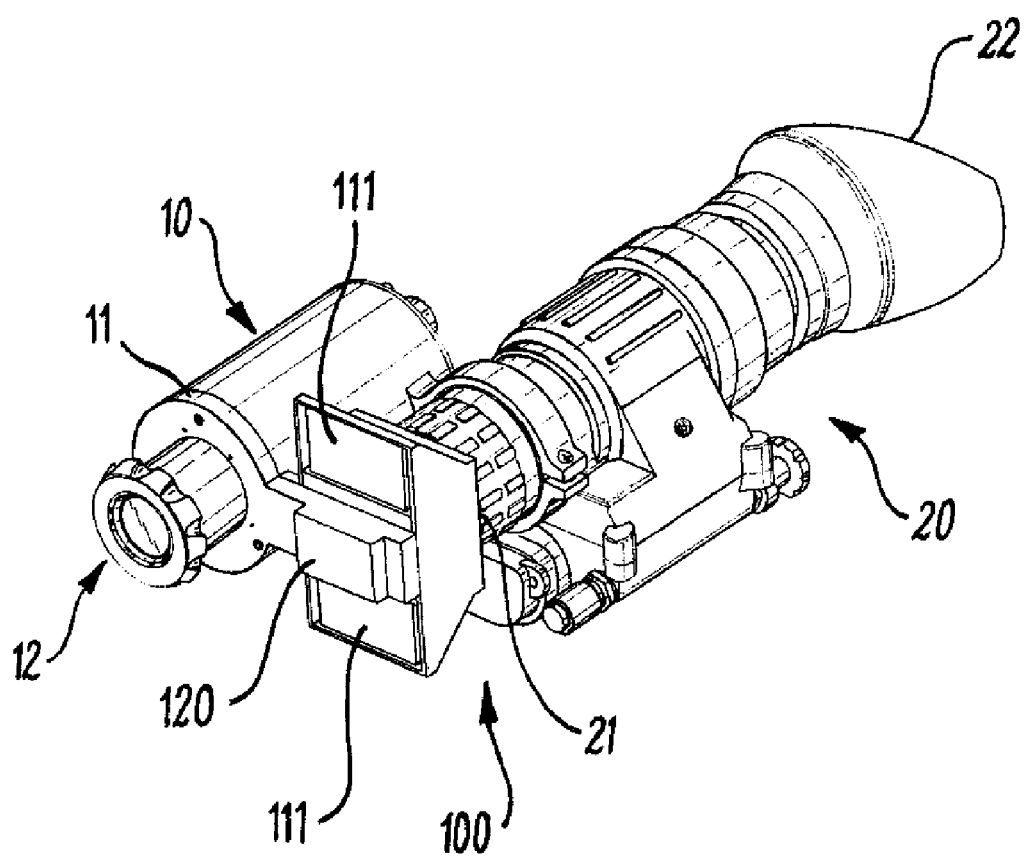
FIG. 1 shows an thermal imaging attachment for an image intensifier sight incorporating an optical bypass device in accordance with the present invention.

Turning now to the figures, a thermal imaging attachment 10 for an image intensifier sight 20 is shown. The image intensifier sight comprises an aperture 21 though which incident light can be captured. The captured light is amplified and may be viewed through eyepiece 22. The thermal imaging attachment comprises a thermal imaging camera 11 capturing incident infra red light through aperture 12. The captured images are fed to a projector (not shown) for projection into the image intensifier by optical bypass device 100

The optical bypass device 100 comprises a pair of prisms 110. The capture apertures 111 of the prisms 110 are provided on either side of a projector block 120. The exit apertures 112 are substantially adjacent to one another. In this manner the prisms 110 can act to direct incident light around the projector block 120 and into the image intensifier aperture 21. In the projector block 120 is provided an OLED screen operable to display an image including text overlay information corresponding to that captured by the thermal imaging camera 10. The image is projected through a small opening 113 provided where the prisms 110 are connected.

In this manner, a user can see a composite image of captured radiation in the visible and infra red ranges. The use of the prisms 110 enables the provision of a projector 121 in such a manner that it does not unduly obstruct the field of view of the image intensifier 20. Additionally, the projector intensity can be adapted readily to adjust the relative image recombination without adversely affecting the sensitivity of the image intensifier 20.

Figure 2A:
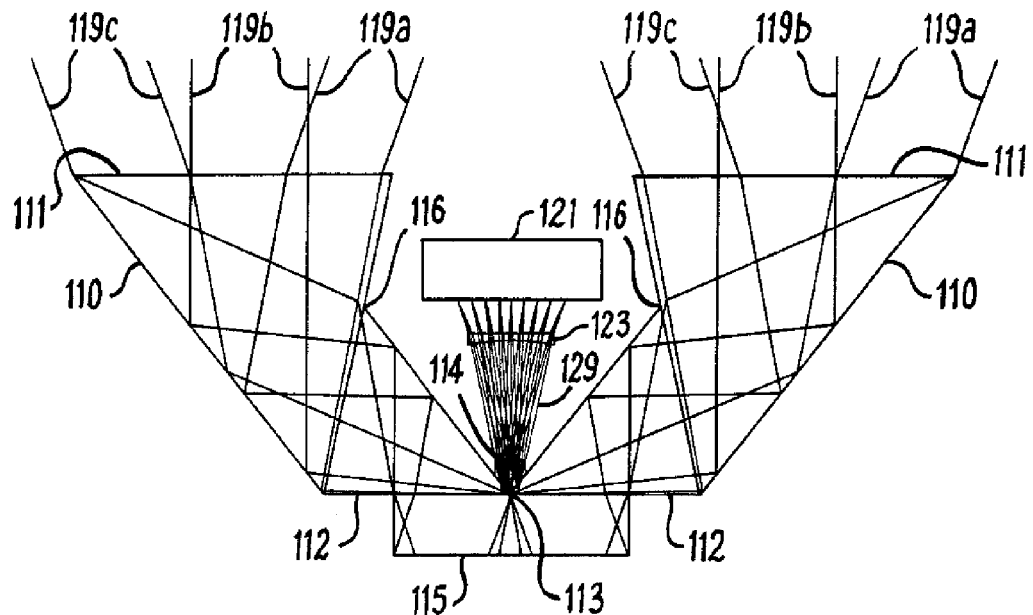
FIG. 2a is a schematic cross-sectional illustration of the prism arrangement of an optical bypass device according to the present invention.
Figure 2B:
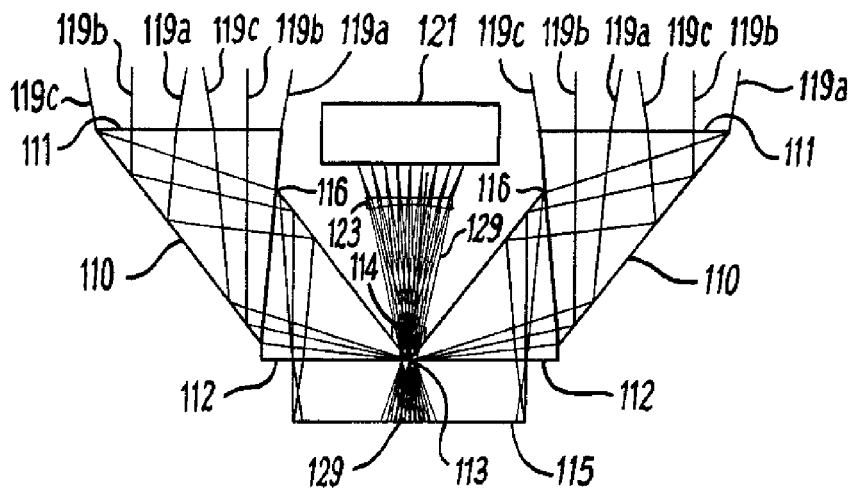

Turning now to FIGS. 2a and 2b, these illustrate schematically how the combination of images is achieved using the optical bypass device 100. In FIG. 2a, a prism arrangement having a 40° field of view is shown whilst in FIG. 2b, a prism arrangement having a 20° field of view is shown. In each case this is illustrated by three pairs of rays, 119a, 119b & 119c one pair on axis and a pair illustrating either extreme. As can be seen, if a wider field of view is required the capture apertures 112 of the prisms must be wider and the prisms 110 must be deeper.

The prisms 110 are bonded to a glass plate 115 which keeps them together. The glass plate 115 may be provided with a mask (not shown). The mask can be used to surpass unwanted ray paths. Similarly, the capture aperture may be masked to suppress unwanted ray paths. As an additional or alternative means of suppression, the edge 116 can be chamfered.

Between the prisms 110 is provided the Projector 121, in this example an OLED screen. A lens 123 is provided to focus light from the projector 121 through an opening 113 provided at the joint between the two prisms 110. The opening 113 may be provided with a shaped surface 114 to act as a lens, if desired. In FIG. 2a, the ray paths 129 from the projector 121 to the opening 113 only are shown whilst in FIG. 2b the ray paths 129 are extended beyond the opening 113. This clearly illustrates how a composite image can be formed using the optical bypass device 100.

The optical bypass device 100 may be provided with shutter means (not shown) which can slide over the capture apertures 111 of the prisms 110. This would allow the optical bypass device 100 to block out light so that the intensifier 20 can be used to image thermal data in daylight without damaging the intensifier tube.

Whilst the example shown relates to adding thermal imaging capacity to an image intensifier sight 20, the skilled man will be aware that the projector 121 may additionally or alternatively be adapted to project other data into a combined image. This might be alphanumerical data, perhaps indicating time/date, range, inclination, altitude, orders or other relevant information. In some embodiments, the optical bypass device 100 may be connected to a laser rangefinder or similar. This can allow range information (textual, numerical or otherwise) to be injected into an image viewable through a connected device such as a camera or similar without interfering with the camera's field of view.

The skilled man will also be aware that the device may alternatively be fitted to any other optical device, for example a magnifying device such as a telescope or telescopic sight. This can thus enable the generation of other forms of composite image.

It is of course to be understood that the invention is not to be restricted to the details of the above embodiments which are described by way of example only.

The invention claimed is:

1. An optical bypass device comprising:
   a pair of prisms having separated capture apertures and adjacent exit apertures; and a projector provided between the prisms and operable to project light through an opening provided between the exit apertures of the prisms.

2. An optical bypass device as claimed in claim 1 wherein the projector comprises a LCD (liquid crystal display), an LED (light emitting diode) display unit or an array of Organic LEDs.

3. An optical bypass device as claimed in claim 1 wherein the projector is provided with a lens to focus the projected image.

4. An optical bypass device as claimed in claim 1 wherein the projector is controlled by electrical, optical or RF signals from a separate component or device.

5. An optical bypass device as claimed in claim 1 wherein the projector is operable to display any one or more of: text (including alphanumeric characters and symbols), icons, images related to those captured by the prisms or images unrelated to those captured by the prisms.

6. An optical bypass device as claimed in claim 1 wherein the projector is adapted to project an image captured by another imaging device.

7. An optical bypass device as claimed in claim 6 wherein the other imaging device is a device adapted to capture an image in a different wavelength range.

8. An optical bypass device as claimed in claim 6 wherein the other imaging device is operable to capture an infrared image.

9. An optical bypass device as claimed in claim 1 wherein the prisms are in contact at their exit apertures.

10. An optical bypass device as claimed in claim 9 wherein the opening is comprised of corresponding cutaway sections of each prism.

11. An optical bypass device as claimed in claim 10 wherein the cutaway sections are formed in the prisms before assembly.

12. An optical bypass device as claimed in claim 1 wherein a glass plate is bonded across the exit apertures of the prisms.

13. An optical bypass device as claimed in claim 12 wherein one or more additional glass plates are bonded across the prisms at their capture apertures or midway between the capture apertures and the exit apertures or along the sides of the prisms.

14. An optical bypass device as claimed in claim 1 wherein one or more lenses are provided in order to focus the captured light.

15. An optical bypass device as claimed in claim 1 wherein each prism is adapted to cover an approximately equal field of view.

16. An optical bypass device as claimed in claim 1 wherein the prisms are adapted to block some stray light paths.

17. An optical bypass device as claimed in claim 1 wherein the prisms are formed of a material having a refractive index around 1.8.

18. An optical bypass device as claimed in claim 1 wherein the device is provided within a suitable housing comprised of an opaque material.

19. An optical bypass device as claimed in claim 18 wherein the housing incorporates a raised rim provided around the capture apertures of the prisms.

20. An optical bypass device as claimed in claim 18 wherein the housing incorporates shutter means operable to block light from being incident on the capture apertures of the prisms.

21. An optical bypass device as claimed in claim 20 wherein the shutter means are powered.

22. An optical bypass device as claimed in claim 1 wherein the optical bypass device is adapted to connect to an additional optical device or system by providing a suitable bracket or connection element at the exit apertures.

23. An optical bypass device as claimed in claim 22 wherein the bracket or connection element is incorporated into the housing.

24. An optical bypass device as claimed in claim 1 wherein the optical bypass device is adapted to be fitted to an image intensifier, a magnifying device or other device utilising the optical capture of visible light.

25. A thermal imaging attachment for an image intensifier comprising:
   a thermal imaging device operable to capture an image and output a signal indicative thereof;
   an optical bypass device comprising a pair of prisms having separated capture apertures and adjacent exit apertures; and
   a projector provided between the prisms and operable to project light through an opening provided between the exit apertures of the prisms,
   the optical bypass device adapted such that its exit apertures may be positioned adjacent to the aperture of the image intensifier and such that the projector of the optical bypass device is operable in response to the signal output by the thermal imaging device.

* * * * *